US006381821B1

(12) United States Patent
Panyon, Jr.

(10) Patent No.: US 6,381,821 B1
(45) Date of Patent: May 7, 2002

(54) EMITTER BARB INSTALLATION TOOL AND EMITTER BARB CLUSTER

(75) Inventor: Larry A. Panyon, Jr., Scottsdale, AZ (US)

(73) Assignee: L.A.P. Innovations, Inc.

( * ) Notice: Subject to any disclaimer, the term of this patent is extended or adjusted under 35 U.S.C. 154(b) by 0 days.

(21) Appl. No.: 09/449,067

(22) Filed: Nov. 24, 1999

(51) Int. Cl.$^7$ .......... B23P 11/00

(52) U.S. Cl. .......... 29/33 R; 239/547; 239/272; 137/318; 29/811.2; 29/798; 29/809; 29/428

(58) Field of Search .......... 137/318; 227/127, 227/109, 120, 123, 64, 60, 59, 55, 58; 239/272, 600, 271, 542, 547; 29/432, 432.2, 811.2, 275, 280, 798, 33 R, 809, 428; 138/42, 43

(56) References Cited

U.S. PATENT DOCUMENTS 3,509,905 A * 5/1970 Mullins .......... 137/318
3,633,599 A * 1/1972 Roos .......... 137/318
3,698,419 A * 10/1972 Tura
3,756,261 A * 9/1973 Minchhoff .......... 137/318
4,089,099 A * 5/1978 Nivet .......... 29/811.2
4,522,339 A 6/1985 Costa .......... 239/272
4,535,925 A * 8/1985 Ramey et al. .......... 29/811.2
4,624,401 A * 11/1986 Gassner et al. .......... 227/127
5,177,846 A 1/1993 Bryant .......... 29/237
5,605,269 A * 2/1997 Musiani .......... 227/109
5,620,020 A * 4/1997 Collins .......... 137/318
5,653,371 A 8/1997 Hou .......... 227/109
5,659,935 A * 8/1997 Lo-Pinto et al. .......... 137/318
5,722,142 A 3/1998 Myers .......... 29/268
5,893,201 A 4/1999 Myers .......... 29/268

OTHER PUBLICATIONS

Rain Bird Catalog p. 199, "Bug gun Emitter Installation Tool", 2001 Catalog, www.rainbird.com.*

* cited by examiner

*Primary Examiner*—S. Thomas Hughes
*Assistant Examiner*—Steven Blount

(57) ABSTRACT

Emitter barb installation tool 20 has driving mechanism 24, emitter barb feeder magazine 26 and pipe support 22. Pipe support 22 holds and supports a pipe 5. Feeder magazine 26 holds and feeds emitter barbs 10. Feeder magazine 26 places one of the emitter barbs 10 into a driving position. Driving mechanism 24 drives the emitter barb 10 from the driving position towards and into the pipe 5 held and supported by the pipe support 22. After the one barb 10 has been driven into the pipe 5, the pipe 5 with installed barb 10 is released from the tool 20. Another emitter barb 10 in the feeder magazine 26 is then automatically located into the driving position for the next installation into a pipe 5. This installation process automatically and continuously repeats for insertion of additional emitter barbs 10. Individual emitter barbs 10 are detachably coupled to one another to form an emitter barb cluster 74. Emitter barb installation tool 20 is able to punch a starter hole into the pipe 5 before the emitter barb 10 is inserted into the pipe 5. Emitter barb installation tool 20 either manually or electrically or pneumatically or hydraulically drives emitter barbs 10 into a pipe 5. Emitter barb installation tool 20 may have a cutter mechanism 122 for cutting pipes. Emitter barb installation tool 20 may also have removable jaw inserts 134 to allow various sized pipes 5 to be held and supported by pipe support 22.

20 Claims, 15 Drawing Sheets

EMITTER BARB INSTALLATION TOOL AND EMITTER BARB CLUSTER

FIELD OF INVENTION

The present invention relates to an emitter barb cluster and emitter barb installation tool, and in particular, to an emitter barb cluster for use in an emitter barb installation tool and an emitter barb installation tool that automatically and continuously feeds emitter barbs into a driving position wherein each barb is driven into a pipe.

BACKGROUND OF INVENTION AND BRIEF DESCRIPTION OF THE PRIOR ART

Emitter barbs 10 are hollow fittings that tap into a pipe so that fluids are routed to various outside locations along the pipe. A common use of emitter barbs 10 are for irrigation pipes and sprinkler systems wherein water is flowed or dripped at various plant or vegetation locations. FIGS. 2 and 3 show two types of conventional prior art emitter barbs 10A and 10B. These prior art barbs 10A and 10B exist independently and are typically installed into flexible pipes by first punching holes into the pipe and then manually inserting the barbs one at a time therein. FIG. 2 shows a self-perforating emitter barb 10A having sharpened ends 12 wherein the self-perforating barb 10A is manually installed without necessarily first punching a starter hole in the pipe. The sharpened ends 12 are able to pierce the wall of the pipe when it is forced thereat. However, these self-perforating barbs 10A are typically made of plastic materials such that forcing them into the pipe without first punching a hole may be cumbersome or difficult. FIG. 3 shows an emitter barb 10B that has blunt ends 14 (i.e. does not have sharpened ends) wherein it is necessary to first punch a starter hole in the pipe before the barb 10B is installed therein.

Tools for installing emitter barbs into a pipe have been developed. Some examples of such prior art tools are disclosed in U.S. Pat. Nos. 4,522,339 ("the '339 patent"); 5,177,846 ("the '846 patent"); 5,722,142 ("the '142 patent"); and 5,893,201 ("the '201 patent"). The '846 patent discloses a prior art tool that simply holds the emitter barb in a handle, and the handle is driven by the user so that the emitter barb is installed into the pipe. The '339 patent, '142 patent and '201 patent disclose prior art tools that hold or support the pipe in place and also hold the emitter barb in place so that the emitter barb is able to be driven into the pipe. The problem with these prior art tools is that each time an emitter barb is to be driven to the pipe, the user has to manually insert the barb into place before it is driven by the tool into the pipe. Also, the prior art tools that hold and support the pipe may be more cumbersome to use and/or require more movement or action when the barb is being installed and when the pipe is being released from the tool after the barb has been installed. Typically, at least two movements of the tool is required in order to install the barb, that is, a movement for driving the barb into the pipe and another movement for releasing the barb and the pipe from the tool.

Additionally, the tools disclosed in the prior art patents do not provide a mechanism wherein a starter hole is first punched into the pipe before the emitter barb is installed therein. The prior art tools, therefore, are not able to install the emitter barbs 10B (i.e. with blunt ends) into a pipe without first having to manually punch a starter hole.

Automatic and continuous feeders for other tools such as nail guns and staple guns exist. U.S. Pat. No. 5,653,371 provides an example of such a feeder for a nail gun. However, an automatic and continuous feeder does not exist for an emitter barb installation tool.

Therefore, the present invention discloses and provides an emitter barb installation tool that automatically and continuously feeds, drives, and inserts the emitter barbs into pipes. Also, the present invention discloses and provides an emitter barb cluster for use in the emitter barb installation tool for easier handling and loading of the emitter barbs. Furthermore, the present invention discloses and provides an emitter barb installation tool that drives the emitter barbs into the pipe and releases the pipe from the tool generally using one fluid motion. Also, the present invention discloses an emitter barb installation tool that punches a starter hole into the pipe before the emitter barb is inserted into the pipe.

SUMMARY OF INVENTION

Set forth is a brief summary of the invention in order to solve the foregoing problems and achieve the foregoing and other objects, benefits, and advantages in accordance with the purposes of the present invention as embodied and broadly described herein.

It is an object and advantage of the present invention to provide a tool for automatically and continuously feeding and driving emitter barbs into a pipe.

It is another object and advantage of the present invention to provide an emitter barb cluster for use in an emitter barb installation tool.

It is further object and advantage of the present invention to provide an emitter barb installation tool that drives the emitter barbs into the pipe and releases the pipe from the tool generally using one fluid motion.

It is still a further object and advantage of the present invention to provide a tool that drives emitter barbs that have either sharpened ends or blunt ends or an emitter barb from an emitter barb cluster.

It is another object and advantage of the present invention to provide an emitter barb installation tool that punches a starter hole into the pipe before the emitter barb is inserted into the pipe.

It is a further object and advantage of the present invention to provide various types of feeder magazines for an emitter barb installation tool that automatically and continuously place emitter barbs into a driving position.

It is still a further object and advantage of the present invention to provide an emitter barb installation tool that has a pipe support to hold and support a pipe.

It is still another object and advantage of the present invention to provide various types of pipe supports such as jaw or jaws for an emitter barb installation tool.

It is still a further object and advantage of the present invention to provide various types of driving mechanisms for an emitter barb installation tool to drive emitter barbs from a driving position and into the pipe.

It is another object and advantage of the present invention to provide various types of driving handles for an emitter barb installation tool.

It is another object and advantage of the present invention to provide an emitter barb installation tool that electrically, pneumatically or hydraulically drives emitter barbs into a pipe.

It is still another object and advantage of the present invention to provide an emitter barb installation tool that also has a cutter mechanism for cutting pipes.

It is a further object and advantage of the present invention to provide an emitter barb installation tool that also has removable jaw inserts to allow pipes of various sizes to be to be held and supported.

The preferred embodiments of the inventions are described below in the Figures and Detailed Description. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Detailed Description is not intended to indicate a desire to invoke the special provisions of 35 U.S.C. Section 112, paragraph 6 to define the invention. To the contrary, if the provisions of 35 U.S.C. Section 112, paragraph 6, are sought to be invoked to define the inventions, the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. Section 112, paragraph 6. Moreover, even if the provisions of 35 U.S.C. Section 112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DETAILED DESCRIPTION

Figure 1:
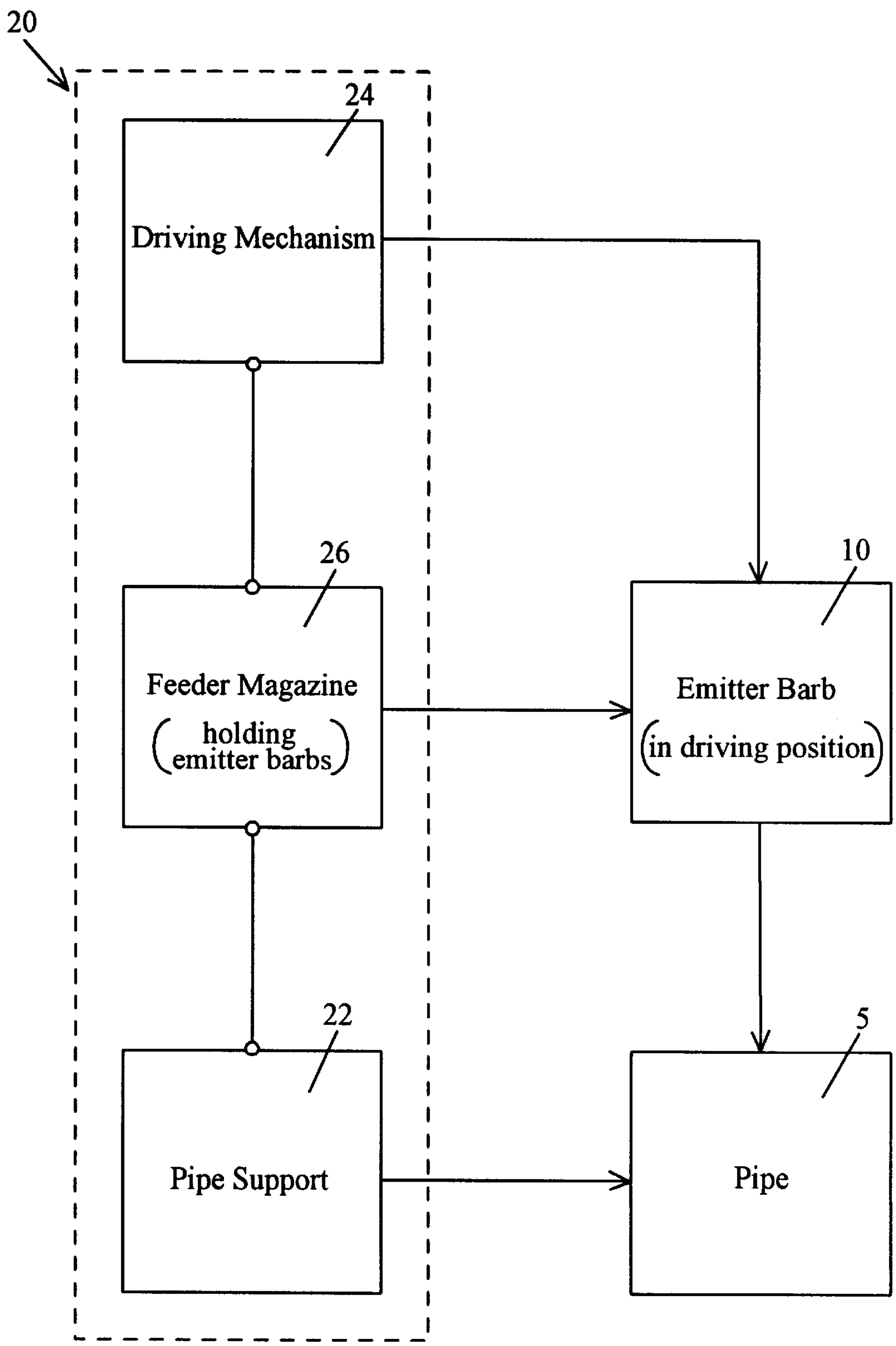
FIG. 1 is a block diagram of the present invention emitter barb installation tool, pipe, and emitter barb.
Figure 2:
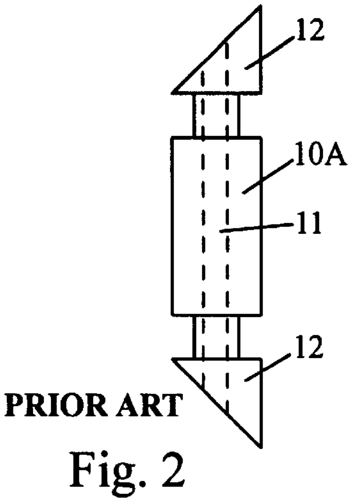
FIG. 2 is a side view of a prior art emitter barb having sharpened ends.
Figure 3:
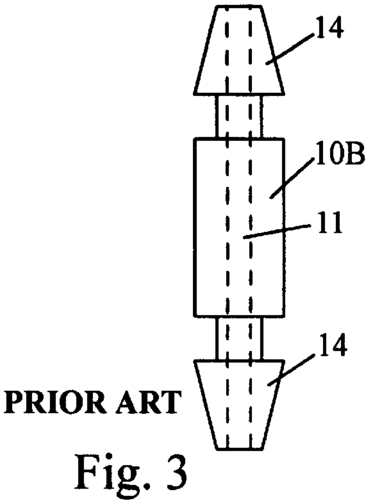
FIG. 3 is a side view of a prior art emitter barb having blunt ends.

FIG. 1 shows a general block diagram of the present emitter barb installation tool invention. The emitter barb installation tool 20 typically has a driving mechanism 24, an emitter barb feeder magazine 26, and a pipe support 22. The pipe support 22 holds and supports a pipe 5. The feeder magazine 26 holds and feeds emitter barbs 10. The feeder magazine 26 places at least one of the emitter barbs 10 at a time into a driving position. The driving mechanism 24 drives the emitter barb 10 from the driving position towards and into the pipe 5 that is held and supported by the pipe support 22. After the one barb 10 has been driven into the pipe 5, the pipe 5 with installed barb 10 is released from the tool 20. Another emitter barb 10 in the feeder magazine 26 is then located into the driving position for the next installation into a pipe 5. This installation process automatically and continuously repeats for insertion of additional emitter barbs 10. The feeder magazine 26 may also be activated manually to continuously locate barbs 10 into the driving position.

Figure 4:
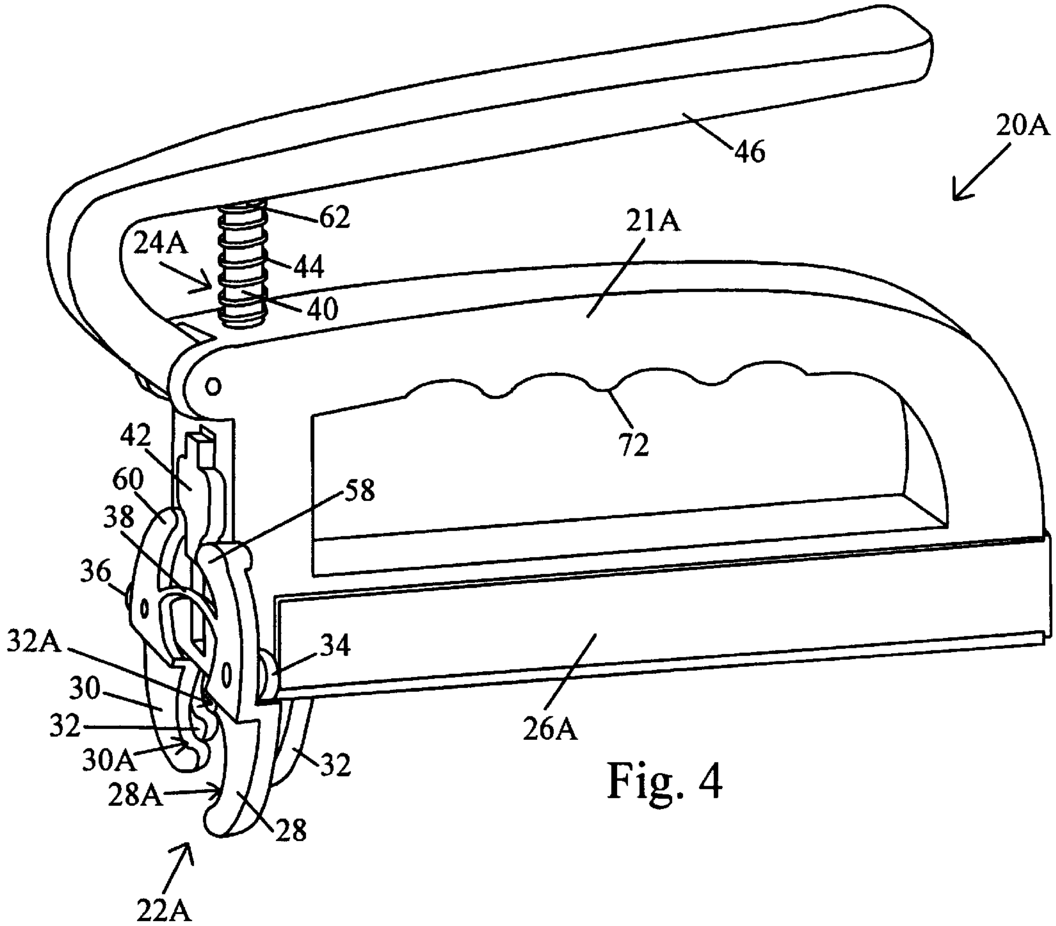
FIG. 4 is a perspective view of a first embodiment of the emitter barb installation tool.

FIGS. 4 to 9 show a first preferred embodiment of the present emitter barb installation tool 20A. Tool 20A has a body portion 21A, a pipe support and holder 22A, a driving mechanism 24A, and an emitter barb feeder magazine 26A. The pipe support and holder 22A has a pair of holding jaws 28 and 30. The holder 22A includes an alignment component 32, the first holding jaw 28, and the second holding jaw 30. The alignment component 32 is a fixed open structure that has an open partially-circular receiving perimeter 32A. The first and second holding jaws 28 and 30 are mirror-image components that generally have respective semi-circular jaw areas 28A and 30A. The alignment component 32 is coupled near the jaws 28 and 30 to help support and hold the pipe in place. The first and second jaws 28 and 30 are pivotably coupled to mounting tabs 34 and 36 fixed to the body portion 21A as shown in FIG. 4. Spring-bias component(s) 38 is/are respectively coupled to the first and second jaws 28 and 30 so that the jaws 28 and 30 are biased in an open position.

FIGS. 5 to 9 show the components for the driving mechanism 24A. Driving mechanism 24A has a piston 40, a wedging component 42, a piston spring 44, and a driving handle 46. The piston 40 is a lengthwise shaft having a receiving area 48 at a driving end 50. The receiving area 48 receives at least a portion of the emitter barb 10 for driving the barb 10 into the pipe 5. The piston 40 is slidingly mounted within a receptacle area 52 located in the body portion 21A, and the piston 40 is generally located vertically above the holder 22A. At a location 54 (which is hereafter referred to as "driving position 54") within the receptacle area 52, an emitter barb 10 from the magazine 26A is located and held in driving position 54. The emitter barb 10 is driven out of the receptacle area 52 through location 56. Wedging component(s) 42 is located at or near driving end 50 of the piston 40. The wedging component(s) 42 is able to wedge and slide between top portions 58 and 60 of respective jaws 28 and 30. The piston spring 44 is located at handle end 62 of the piston 40. The driving handle 46 is pivotably coupled to the body portion 21A. The driving handle 46 is able to contact and drive the piston 40 at its handle end 62.

Figure 10:
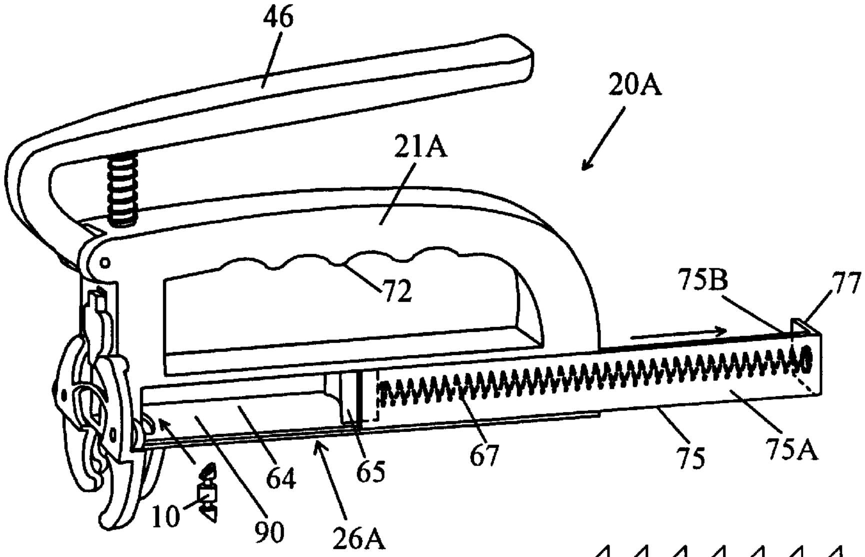
FIG. 10 is a perspective view of the first embodiment emitter barb installation tool showing a first embodiment feeder magazine.
Figure 15:
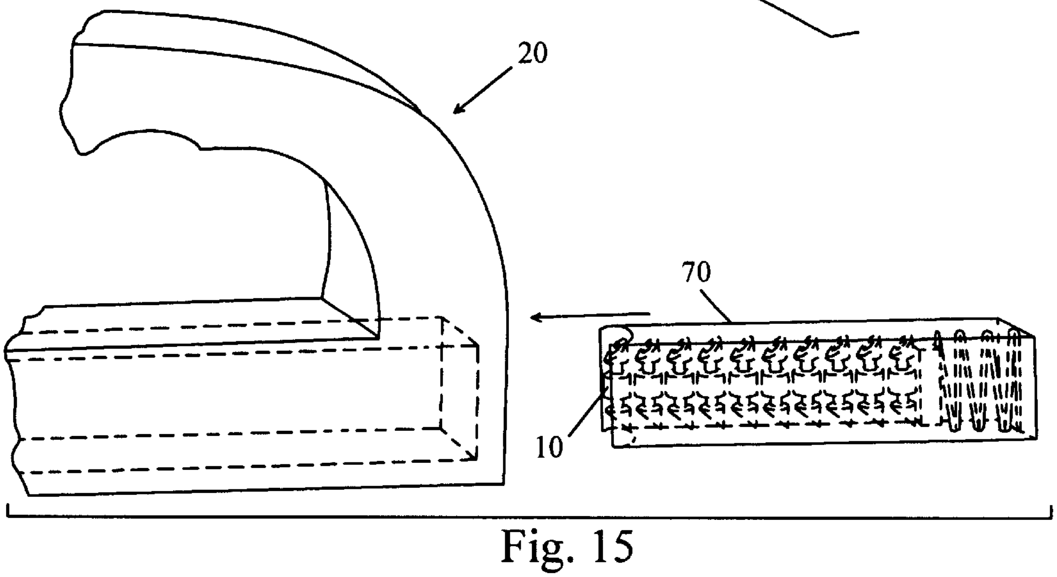
FIG. 15 is a side view of the first embodiment emitter barb installation tool showing a third embodiment feeder magazine.

Referring to FIGS. 10 to 13, the feeder magazine 26A comprises a holding chamber 64, a driving plate 65, and a feed spring 67. The holding chamber 64 holds and stores a number of emitter barbs 10. The driving plate 65 and feed spring 67 provides spring loaded action to automatically and continuously feed an emitter barb 10 into driving position 54. The feeder magazine 26A may be made integral with the body portion 21A such as shown in FIGS. 4 and 10 or made as a separately insertable component 70 (i.e. cartridge or third embodiment feeder magazine) into the tool 20 such as shown in FIG. 15. Furthermore, the body portion 21A has a gripping portion 72 for allowing the user to grip the tool 20A.

Figure 11:
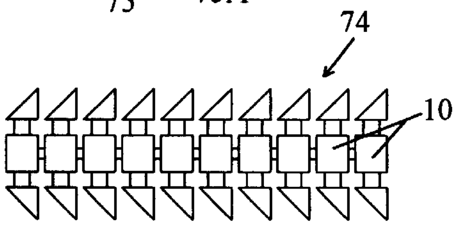
FIG. 11 is a side view of an emitter barb cluster.
Figure 12:
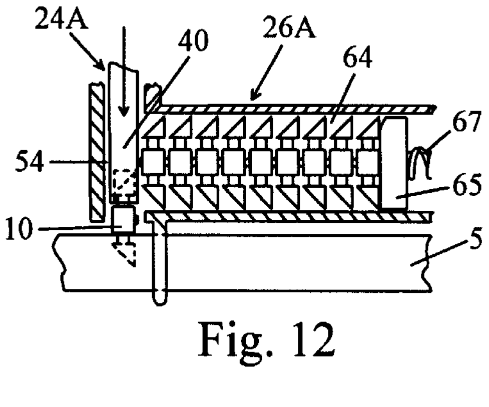
FIG. 12 is a partial cross-sectional side view of the first embodiment emitter barb installation tool showing an emitter barb being driven and separated from the emitter barb cluster.
Figure 13:
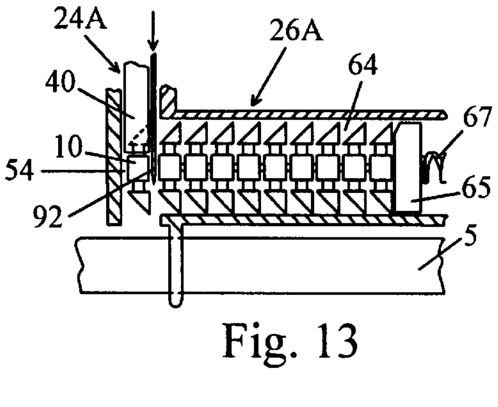
FIG. 13 is a partial cross-sectional side view of the first embodiment emitter barb installation tool showing a cutter blade being used in conjunction with the configuration of FIG. 12.

FIG. 10 shows a first preferred embodiment of the integrally made feeder magazine 26A. The feeder magazine 26A has a driving plate 65, a feed spring 67, and a slidable cover 75 with attached back cover 77. The driving plate 65 is attached to the feed spring 67. The driving plate 65 and feed spring 67 are placed within the chamber 64. The front side 75A of the slidable cover 75 acts as a side of the chamber 64, and the slidable cover 75 is slidably coupled to the other walls of the chamber 64. The cover 75 is able to slide to an open and closed position. The spring 67 is coupled to a back side 75B of the slidable cover 75. The spring 67 and the driving plate 65 move and slide with the cover 75 when the cover 75 is being slid to an open position. When the cover 75 is in the open position, an insertion area 90 is accessible for loading emitter barbs 10. The barbs 10 are placed into the insertion area 90. Alternatively, the emitter barbs 10 may be loaded into the insertion area 90 in coupled clusters 74 such as shown in FIGS. 11 to 13. As the cover 75 is being slid to a closed and locked position, the spring 67 compresses when the driving plate 65 contacts the last emitter barb 10 within chamber 64. Tension is placed on the loaded emitter barbs 10 so that the first emitter barb 10 within the chamber 64 is forced to the driving position 54.

Figure 14:
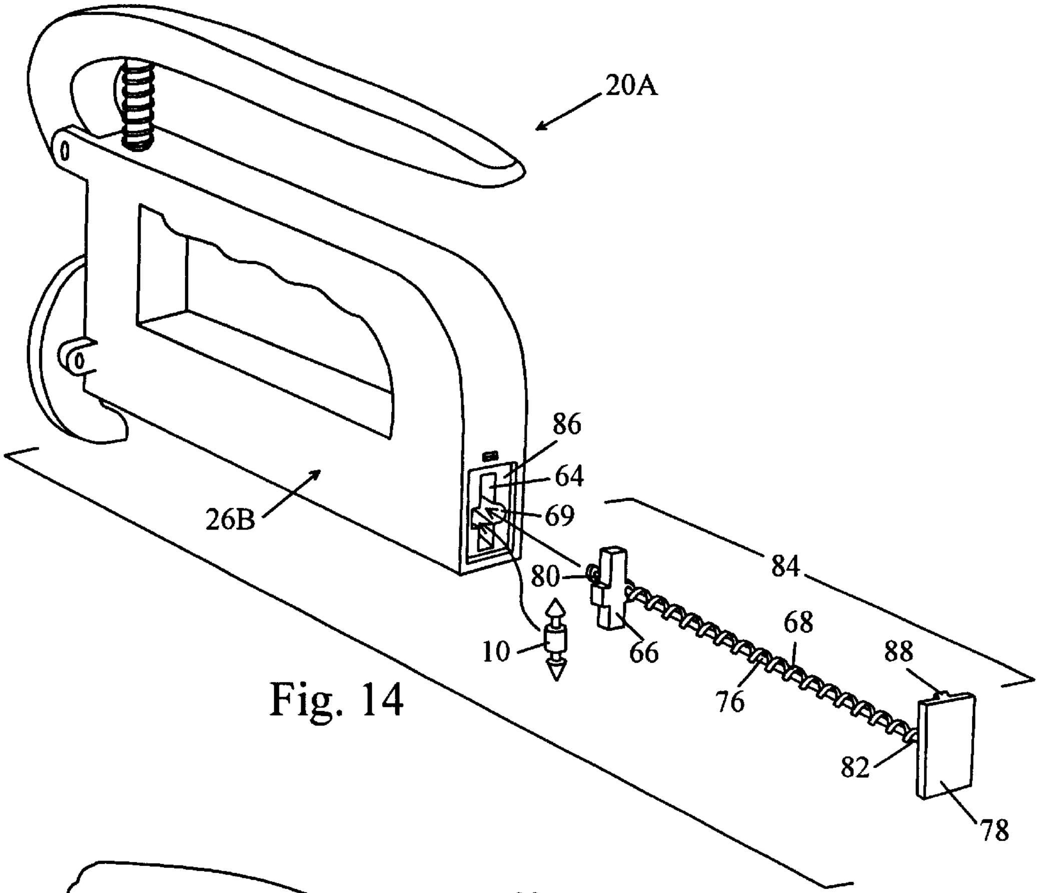
FIG. 14 is a back perspective view of the first embodiment emitter barb installation tool showing a second embodiment feeder magazine.

FIG. 14 shows a second preferred embodiment of the integrally made feeder magazine 26B. The feeder magazine 26B has a driving plate 66, a shaft 76, a feed spring 68, and a back cover 78. The shaft 76 is inserted centrally through feed spring 68. The driving plate 66 is attached and offset at end 80 of shaft 76. The back cover 78 is attached at end 82 of shaft 76. The barbs 10 or barb clusters 74 are placed into the chamber 64. The driving plate 66 together with the shaft 76, spring 68, and back cover 78 are corporately referred to as feeder drive 84. When inserting the feeder drive 84 into the chamber 64, the driving plate 66 contacts the last emitter barb 10 and the feeder spring 68 compresses along the shaft, 76 and the shaft 76 continues to be placed within an offset area 69 of the chamber 64 (i.e. FIG. 14 shows the shaft 76 offset to the right of the emitter barbs 10 when viewing the tool from the back side) until back cover 78 fits flush to the back end 86 of the feeder magazine 26B and locks thereat via locking component 88.

Referring to FIGS. 10 and 14, emitter barbs 10 are loaded into the integrally made feeder magazine 26A or 26B. FIGS. 10 and 14 show each emitter barb 10 loaded into the holding chamber 64 one at a time. Alternatively, the emitter barbs 10 may be loaded into the chambers in coupled clusters 74 such as shown in FIGS. 11 to 13. The driving plate 65 or 66 and feed spring 67 or 68 are fitted into position behind the last emitter barb 10 so that the emitter barbs 10 within the chamber 64 are in spring loaded position in order to be placed into a driving position.

Figure 5:
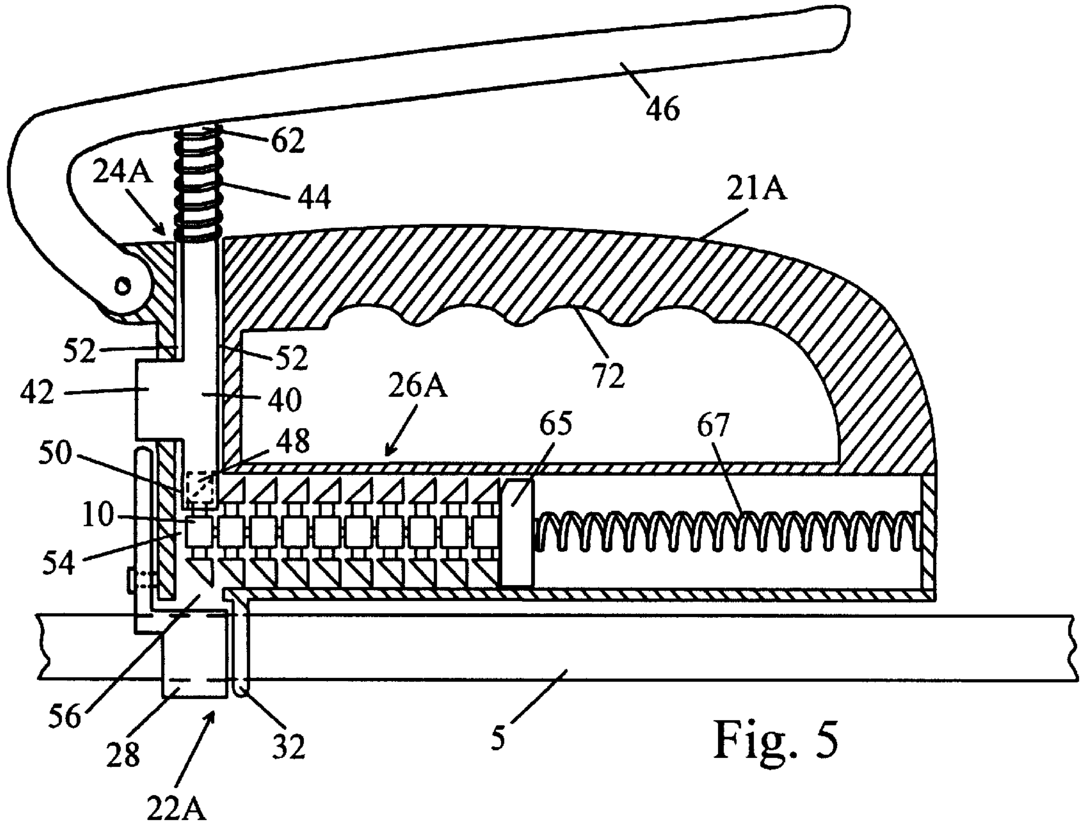
FIG. 5 is a partial cross-sectional side view of the first embodiment of the emitter barb installation tool in a non-driving position.
Figure 6:
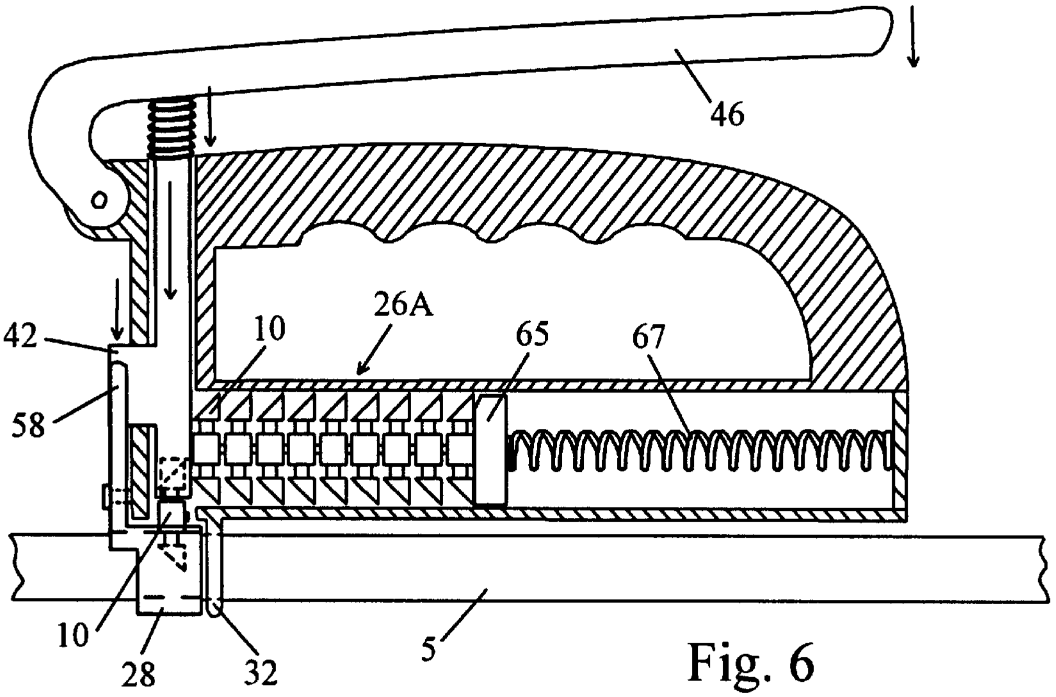
FIG. 6 is a partial cross-sectional side view of the first embodiment of the emitter barb installation tool in a driving position.
Figure 8:
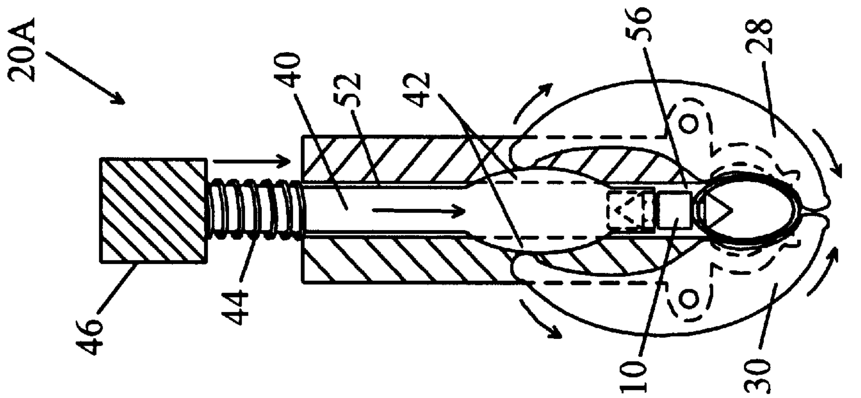
FIG. 8 is a partial cross-sectional front view of the first embodiment emitter barb installation tool in a holding and driving position.
Figure 7:
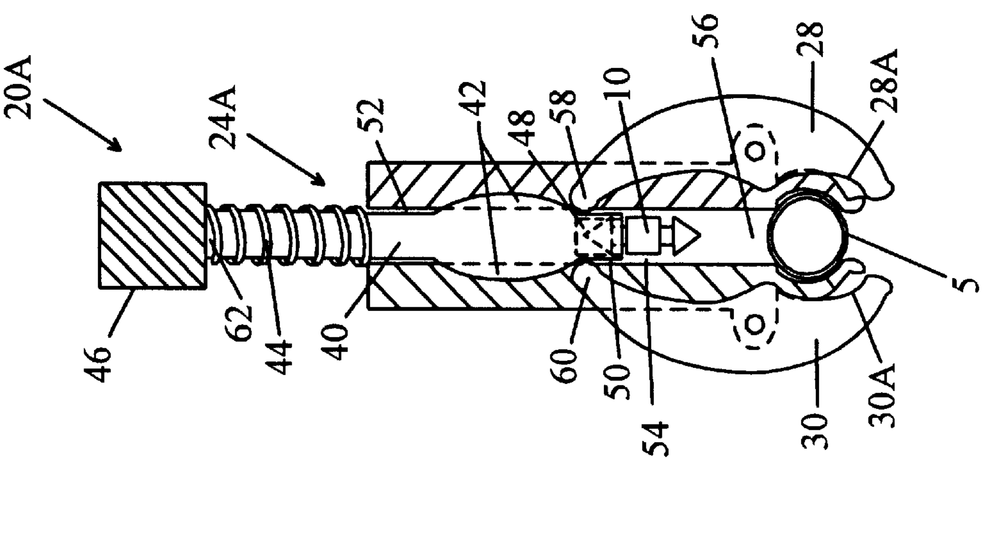
FIG. 7 is a partial cross-sectional front view of the first embodiment emitter barb installation tool in a non-holding and non-driving position.

FIGS. 4, 5, and 7 show the tool 20A in the initial position prior to the user squeezing the driving handle 46. FIGS. 4 and 7 show the jaws 28 and 30 in an open, receiving position, that is, the jaw areas 28A and 30A are made to a wide open receiving area. A pipe 5 is then placed between the jaws 28 and 30 that are in the open, receiving position and also fitted into the receiving perimeter 32A of alignment component 32. The user grips the tool 20A at the gripping portion 72 and also initially grips the driving handle 46. Referring to FIGS. 6 to 9, when the user starts squeezing the driving handle 46, then the driving handle 46 contacts and drives the piston 40 at end 62 and the wedging component(s) 42 wedge between the top portions 58 and 60 of respective jaws 28 and 30. When this wedging of the top portions 58 and 60 occurs, then the first and second jaws 28 and 30 move towards each other to a closed position thereby tightly securing and holding the pipe 5 between the jaws 28 and 30 (i.e. see FIG. 8). While the wedging component(s) 42 stays between the top portions 58 and 60 of the respective jaws 28 and 30, the pipe 5 stays tightly secured therebetween. FIG. 8 shows that pipe 5 is tightly squeezed between the jaws 28 and 30 such that the pipe 5 has moved from a generally circular shape to a generally oval shape.

Figure 9:
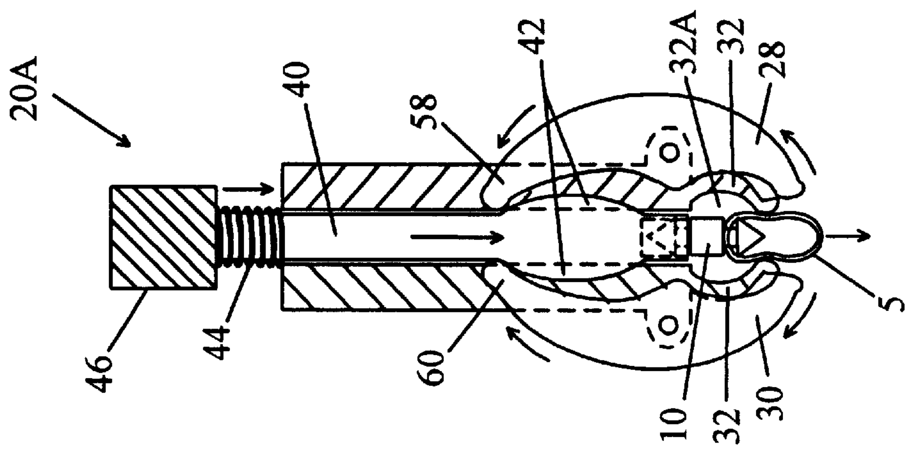
FIG. 9 is a partial cross-sectional front view of the first embodiment emitter barb installation tool in a releasing position.

While the jaws 28 and 30 squeeze the pipe 5, the receiving area 48 of the piston 40 receives and contacts the emitter barb 10 located at the driving position 54. The emitter barb 10 is driven from the driving position 54 and out through location 56 and into the pipe 5. Preferably, the emitter barb 10 is driven into the pipe after the pipe 5 is squeezed into the oval shape as shown in FIG. 8 so that the pipe 5 stays within the jaw areas 28A and 30A and so that the pipe 5 does not become crushed or deformed as the emitter barb is driven therein. For emitter barbs 10A, the sharpened ends 12 would simply pierce through the pipe 5 when the emitter barb 10A is driven therein. The driving handle 46 is further squeezed, and the piston 40 continues to move downwardly within shaft 52 until the wedging component 42(s) passes through the top portions 58 and 60 of respective jaws 28 and 30 as shown in FIG. 9. The jaws 28 and 30 then automatically open, and the pipe 5 with installed emitter barb 10 is then released from the tool 20A. The driving handle 46 is released by the user, and the piston spring 44 causes the piston 40 and the driving handle 46 to generally move upwardly. After the piston 40 moves upwardly past the driving position 54, the next emitter barb 10 in the magazine 26A is pushed into the driving position 54 by the driving plate 65 and feed spring 67. The tool 20A is now back to the installing position for installing the next emitter barb 10 into a pipe 5 as shown in FIGS. 4, 5, and 7.

Figure 18:
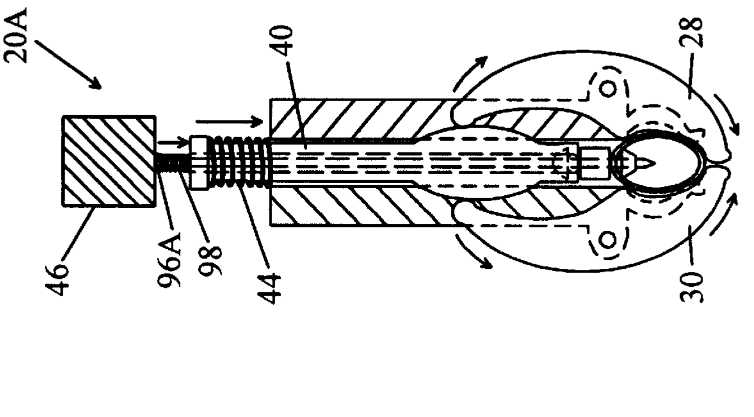
FIG. 18 is a front cross-sectional view of the first embodiment emitter barb installation tool showing the punch assembly in the inserted and driving position.
Figure 17:
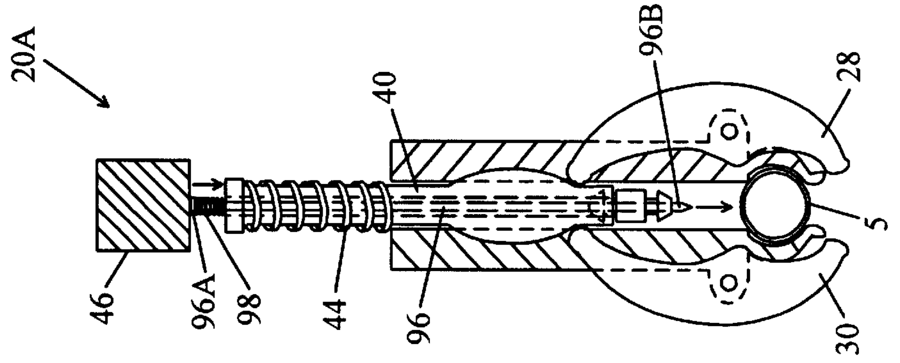
FIG. 17 is a front cross-sectional view of the first embodiment emitter barb installation tool showing the punch assembly in the inserted and non-driving position.
Figure 16:
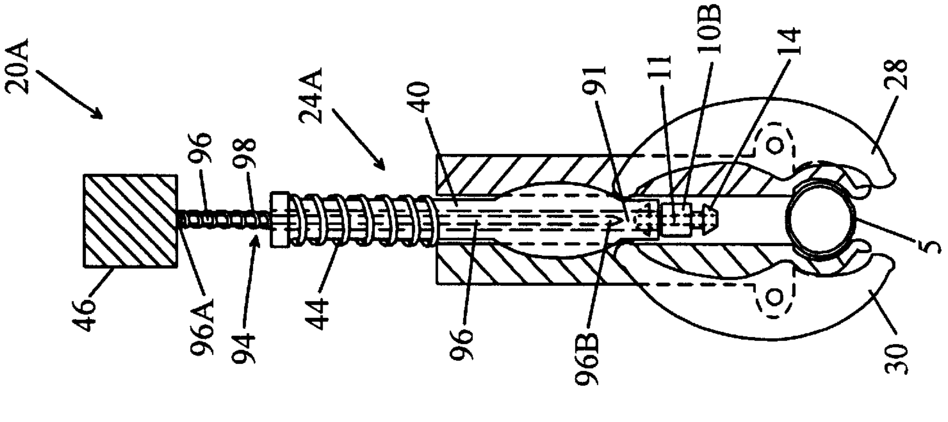
FIG. 16 is a front cross-sectional view of the first embodiment emitter barb installation tool showing a punch assembly in the non-inserted and non-driving position.

Furthermore, referring to FIGS. 16 to 18, a punch assembly 94 is made part of the driving mechanism 24A. The piston 40 has a hollow inner area 91. The punch assembly 94 has a punch shaft 96 with a mounting end 96A and a piercing end 96B and a spring 98. The spring 98 is placed on the shaft 96. One end of the shaft 96 is mounted to the handle 46. The tool 20A is operated in the same manner described above except that the handle 46 first activates the punch assembly 94 by driving the shaft 96 and compressing the spring 98. The shaft 96 is driven through the piston hollow area 91 and further through a hollow area 11 of the emitter barb 10 until the piercing end 96B protrudes through the insertion end of the emitter barb 10 as shown in FIG. 17. As the handle 46 continues to be pressed, the handle 46 drives the piston 40 such that the piercing end 96B first punches through the pipe 5 and the emitter barb 10 is then driven and installed therein as in FIG. 18. The punch assembly 94 allows emitter barbs 10B having blunt ends 14 to be installed by the tool 20A.

For barb clusters 74 as shown in FIG. 12 within the chamber 64 of the magazine 26A, one of the emitter barbs 10 within the cluster 74 will be located in the driving position 54. When the piston 40 of the driving mechanism 24A contacts the one emitter barb 10 in the driving position 54 to drive the emitter barb 10 into the pipe 5, then the one emitter barb 10 in the driving position 54 snaps from the cluster 74 as shown in FIG. 12. After the one emitter barb 10 is installed into the pipe 5, the piston 40 returns past the driving position 54, and the next emitter barb 10 attached to the cluster 74 moves into the driving position 54. FIG. 13 shows a blade 92 used in conjunction with the piston 40 and driving mechanism 24A. The blade 92 is coupled to the piston 40 and aids in separating the one emitter barb 10 in the driving position 54 from the cluster 74.

Also, as shown in FIGS. 11, 12 and 13, it is preferred that self -perforating barb clusters 74 are configured and installed such that the sharpened ends of the barbs 10 are angled towards and inserted in a lengthwise direction of the pipe 5 to prevent the barbs 10 from squeezing along or perforating the outer side walls of the pipe 5.

Figure 11A:
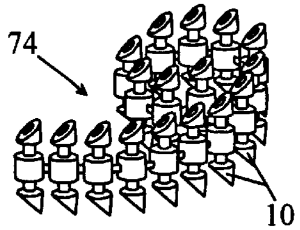
FIG. 11A is a perspective view of a coiled flexible emitter barb cluster.
Figure 11B:
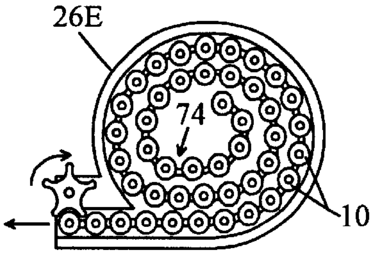
FIG. 11B is a top view of a circular feeder magazine with a coiled flexible emitter barb cluster therein.

Referring to FIGS. 11A and 11B, barb clusters 74 may be relatively long and flexible wherein the barb cluster 74 is able to be coiled around itself for use in a circular feeder magazine 26E.

FIGS. 19 to 22 show a second embodiment emitter barb installation tool 20B. Tool 20B is identical and used in the same general manner as tool 20A except tool 20B has a holding component 22B that has a singular hook jaw 100. The singular hook jaw 100 supports and holds the pipe 5.

Figure 19:
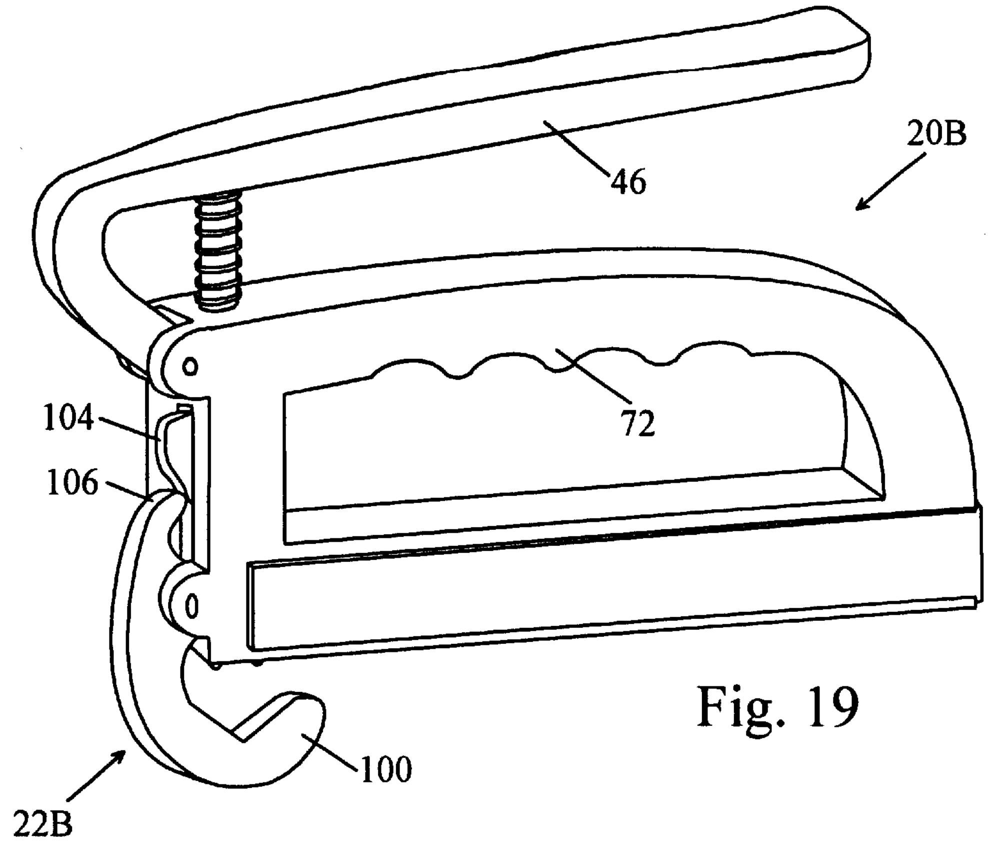
FIG. 19 is a perspective view of a second embodiment emitter barb installation tool.
Figure 20:
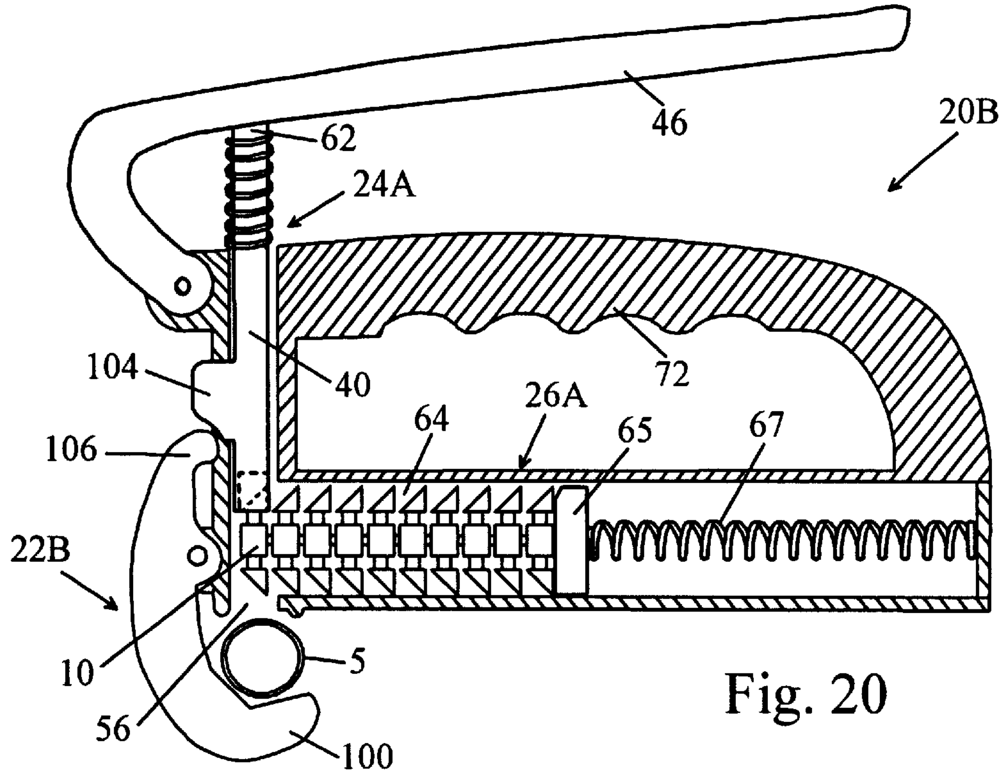
FIG. 20 is a partial cross-sectional side view of the second embodiment emitter barb installation tool in the non-driving position.
Figure 21:
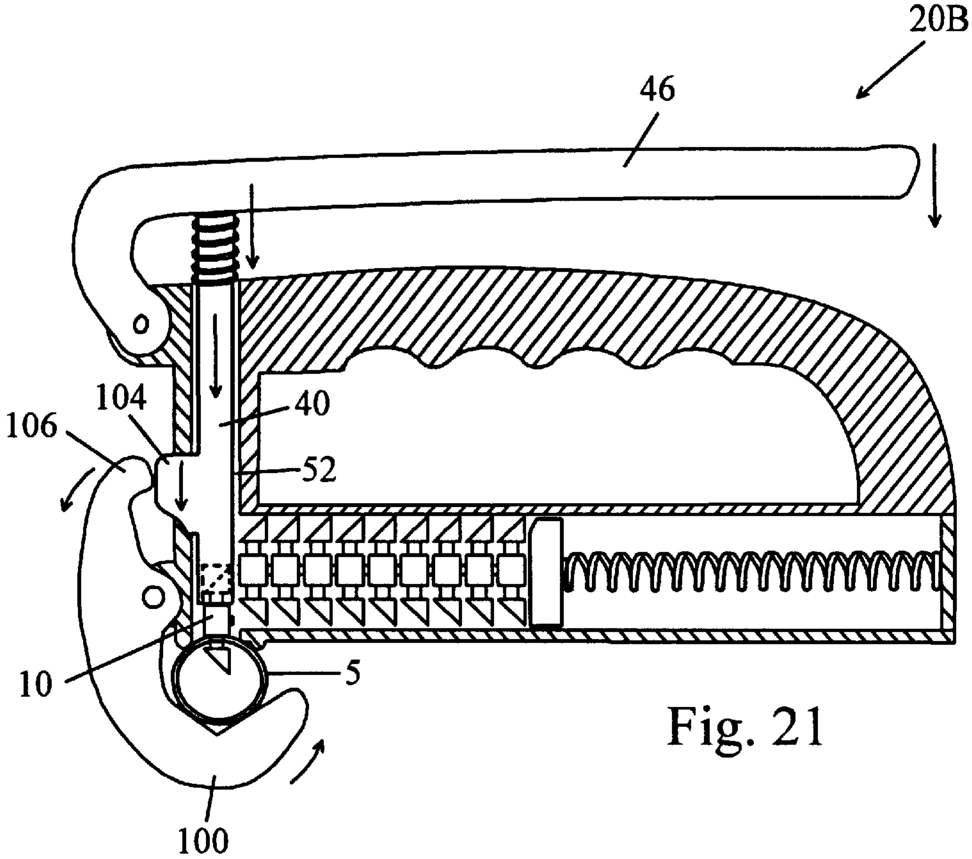
FIG. 21 is a partial cross-sectional side view of the second embodiment emitter barb installation tool in the driving position.

FIGS. 19 and 20 show the tool 20B in the initial position prior to the user squeezing the driving handle 46. FIGS. 19 and 20 show the jaw 100 in an open, receiving position. A pipe 5 is then placed onto the jaw 100 that is in the open, receiving position. The user grips the tool 20B at the gripping portion 72 and also initially grips the driving handle 46. Referring to FIGS. 19 to 22, when the user starts squeezing the driving handle 46, then the driving handle 46 contacts and drives the piston 40 at end 62 and a pushing component 104 pushes the top portion 106 of the jaw 100. When this pushing of the top portion 166 occurs, then the jaw 100 is angled to close around and contact the pipe 5 towards location 56 so that the jaw 100 is in a closed position thereby tightly securing and holding the pipe 5 between the jaw 100 and location area 56 (i.e. see FIG. 21). While the pushing component 104 stays in contact with the top portion 106 of jaw 100, the pipe 5 stays tightly secured thereat.

Figure 22:
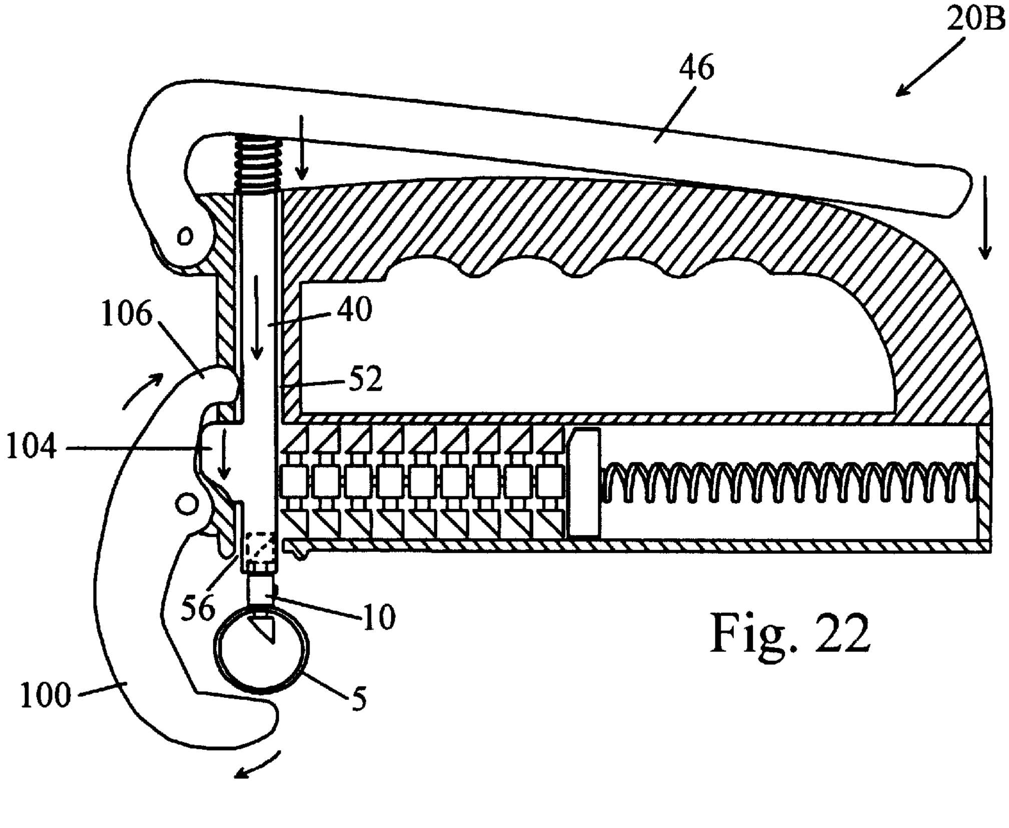
FIG. 22 is a partial cross-sectional side view of the second embodiment emitter barb installation tool in the releasing position.

The emitter barb 10 is driven into the pipe 5 and the driving handle 46 is further squeezed, and the piston 40 continues to move downwardly within shaft 52 until the pushing component 104 moves passed top portion 106 of jaw 100 as shown in FIG. 22. The jaw 100 is then automatically opened, and the pipe 5 with installed emitter barb 10 is then released from the tool 20B.

FIGS. 23 to 26 show a third embodiment emitter barb installation tool 20C. Tool 20C is identical and used in the same general manner as tool 20B except tool 20C has a holding component 22C that has a horizontally positioned moving jaw 108 and a fixed jaw 110. The jaws 108 and 110 support and hold the pipe 5.

Figure 23:
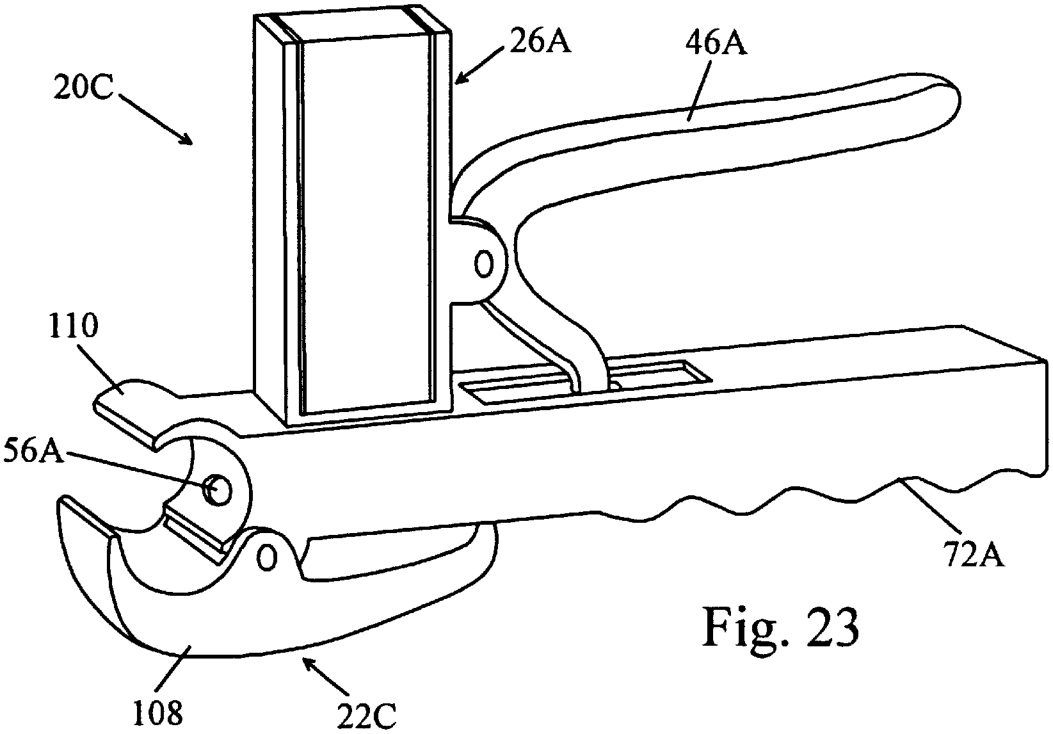
FIG. 23 is a perspective view of a third embodiment emitter barb installation tool.
Figure 24:
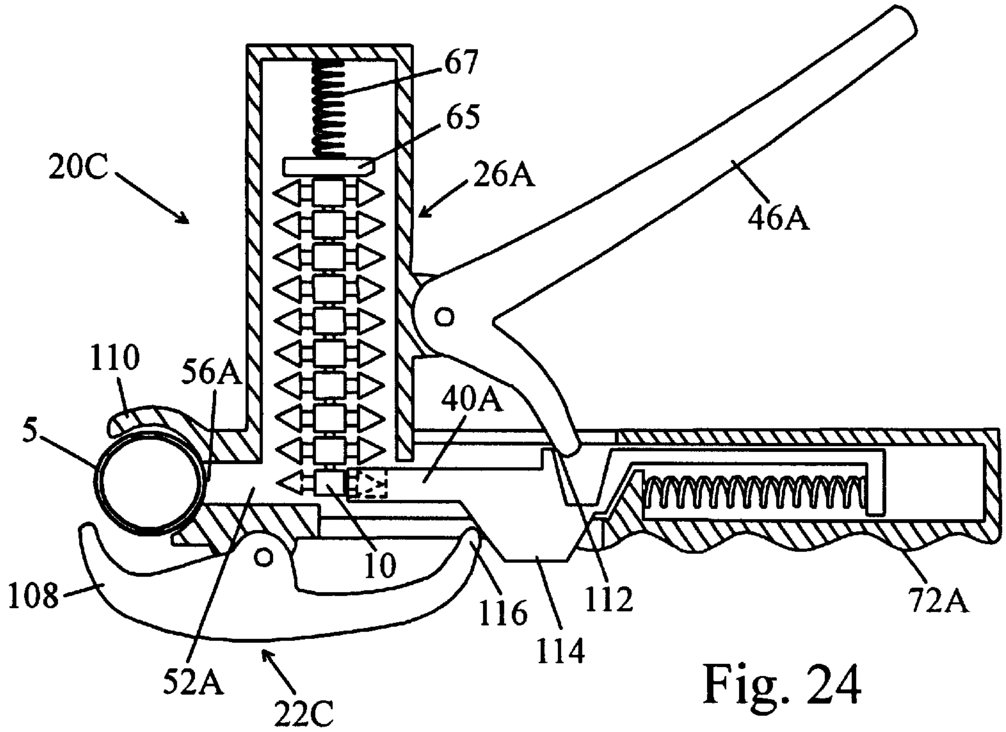
FIG. 24 is a partial cross-sectional side view of the third embodiment emitter barb installation tool in the non-driving position.
Figure 25:
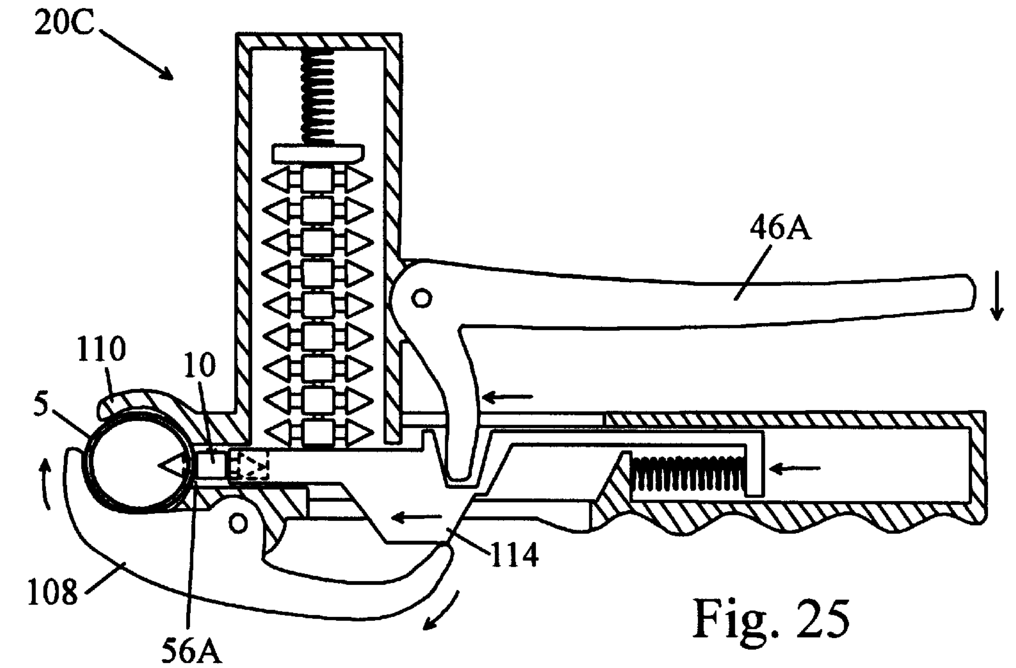
FIG. 25 is a partial cross-sectional side view of the third embodiment emitter barb installation tool in the driving position.

FIGS. 23 and 24 show the tool 20C in the initial position prior to the user squeezing a second embodiment driving handle 46A. FIGS. 23 and 24 show the jaws 108 and 110 in an open, receiving position. A pipe 5 is then placed onto the jaws 108 and 110 that are in the open, receiving position. The user grips the tool 20C at second embodiment gripping portion 72A and also initially grips the driving handle 46A. Referring to FIGS. 23 to 26, when the user starts squeezing the driving handle 46A, then the driving handle 46A contacts at location 112 to drive the piston 40A and a pushing component 114 pushes the portion 116 of the moving jaw 108. When this pushing of the portion 116 occurs, then the moving jaw 108 is angled to close towards the fixed jaw 110 so that the jaws 108 and 110 are in a closed position thereby tightly securing and holding the pipe 5 between the jaws 108 and 110 (i.e. See FIG. 25) at or near location 56A. While the pushing component 114 stays in contact with the portion 116 of jaw 108, the pipe 5 stays tightly secured thereat.

Figure 26:
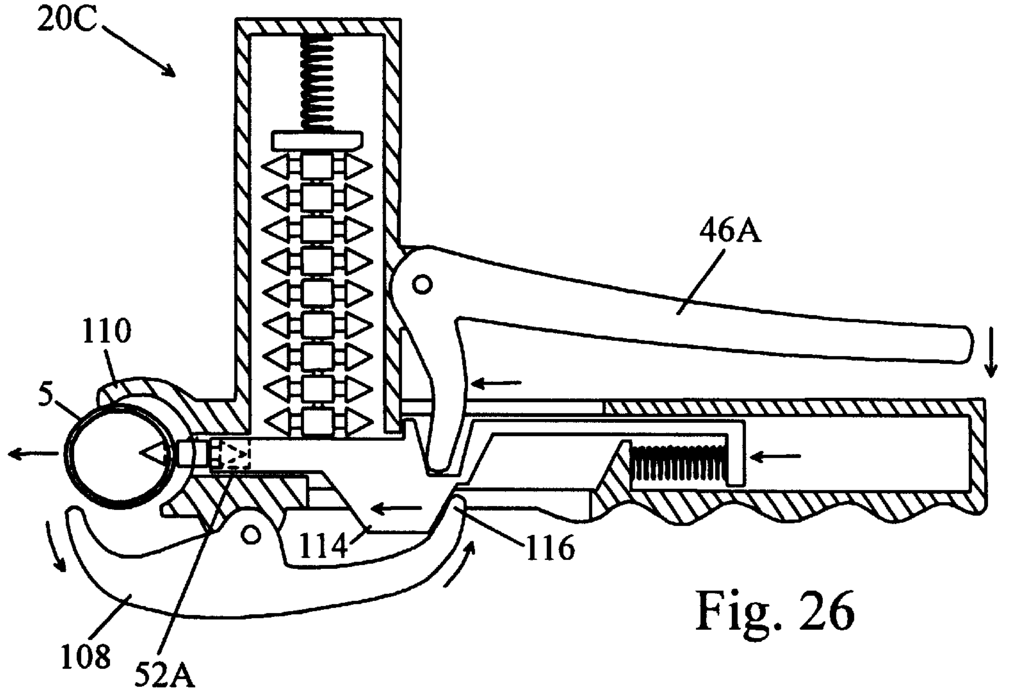
FIG. 26 is a partial cross-sectional side view of the third embodiment emitter barb installation tool in the releasing position.

The emitter barb 10 is driven into the pipe and the driving handle 46A is further squeezed, and the piston 40A continues to move within shaft 52A until the pushing component 114 moves passed the portion 116 of jaw 108 as shown in FIG. 26. The jaw 108 is then automatically moved to an open position, and the pipe 5 with installed emitter barb 10 is then released from the tool 20C.

Figure 27:
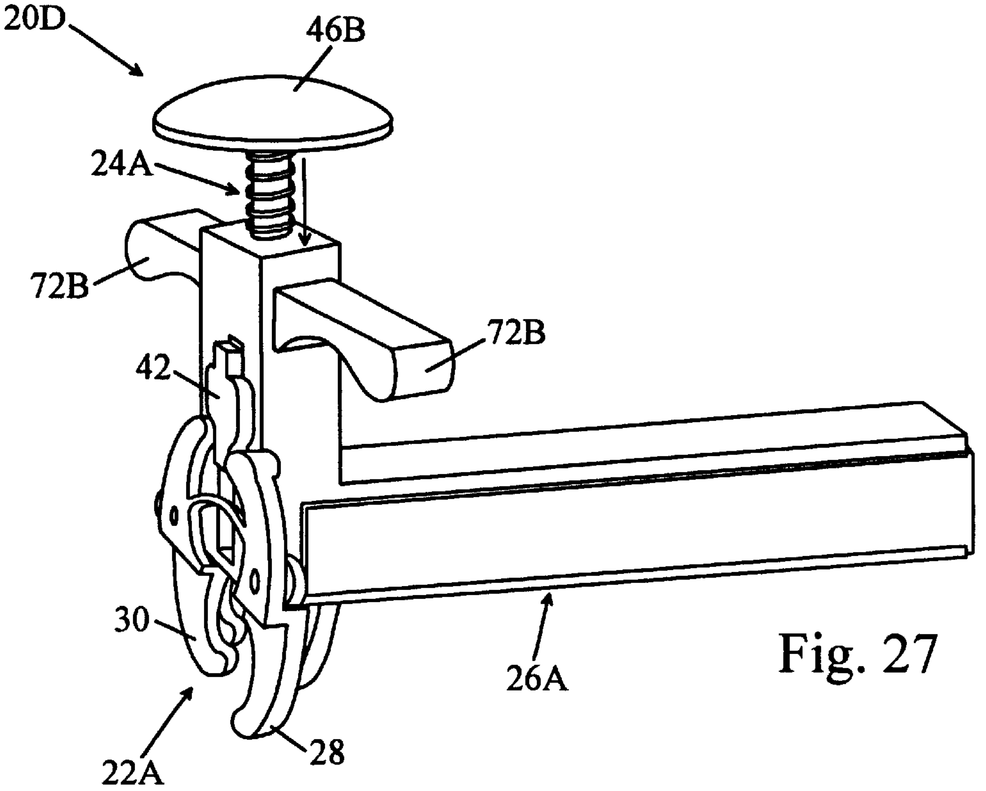
FIG. 27 is a perspective view of a fourth embodiment emitter barb installation tool.

FIG. 27 shows a fourth embodiment emitter barb installation tool 20D. Tool 20D is identical and used in the same general manner as tool 20A except tool 20D has a third embodiment driving handle 46B and third embodiment gripping portions 72B. Driving handle 46B is configured to fit the palm of the user's hand, and the gripping portions 72B are configured to be gripped by the finger(s) of the user.

Figure 28:
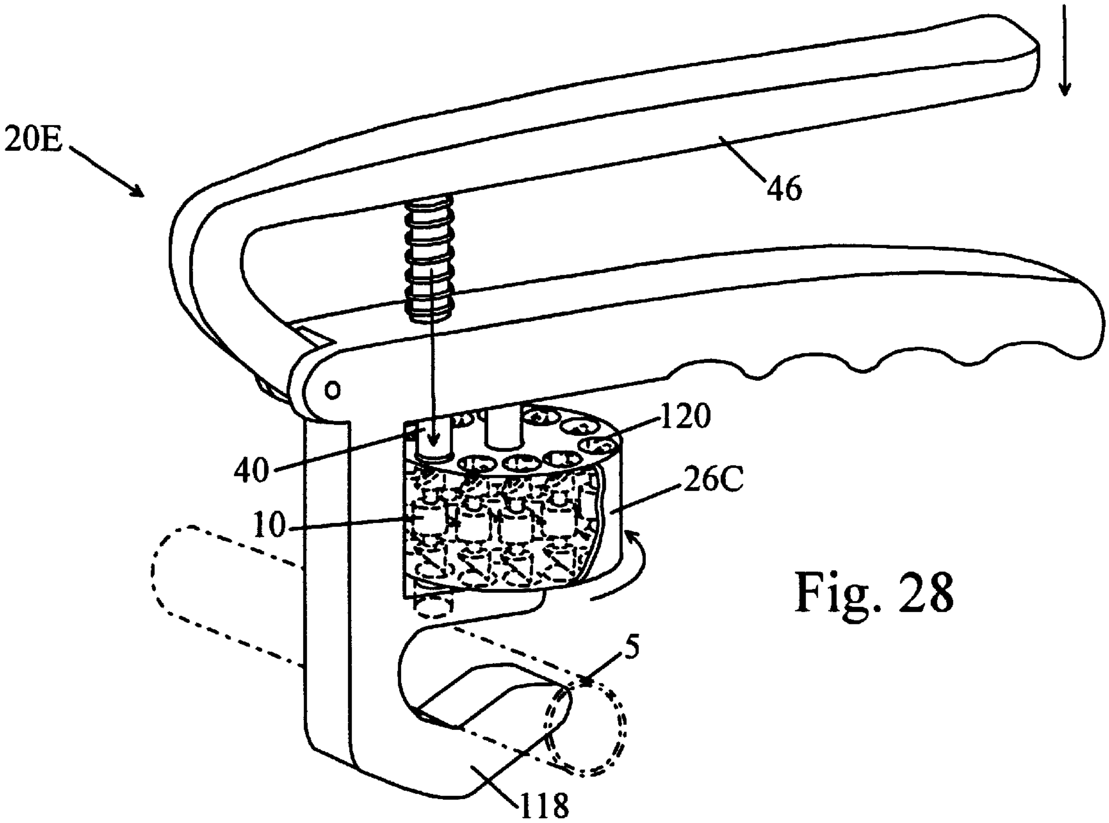
FIG. 28 is a perspective view of a fifth embodiment emitter barb installation tool with a fourth embodiment feeder magazine.

FIG. 28 shows a fifth embodiment emitter barb installation tool 20E. Tool 20E is similar and used in the similar manner as tool 20B except that the tool 20E has a hook jaw 118 that is fixed (i.e. non-movable) and the feeder magazine 26C (i.e. fourth embodiment feeder magazine) is a revolver cylinder. The fixed hook jaw 118 holds the pipe 5, and the revolver feeder magazine 26C has holding chambers 120 that hold emitter barbs 10 to be installed to a pipe 5. The revolver feeder magazine 26C revolves or rotates to position an emitter barb 10 to a driving position.

Figure 29:
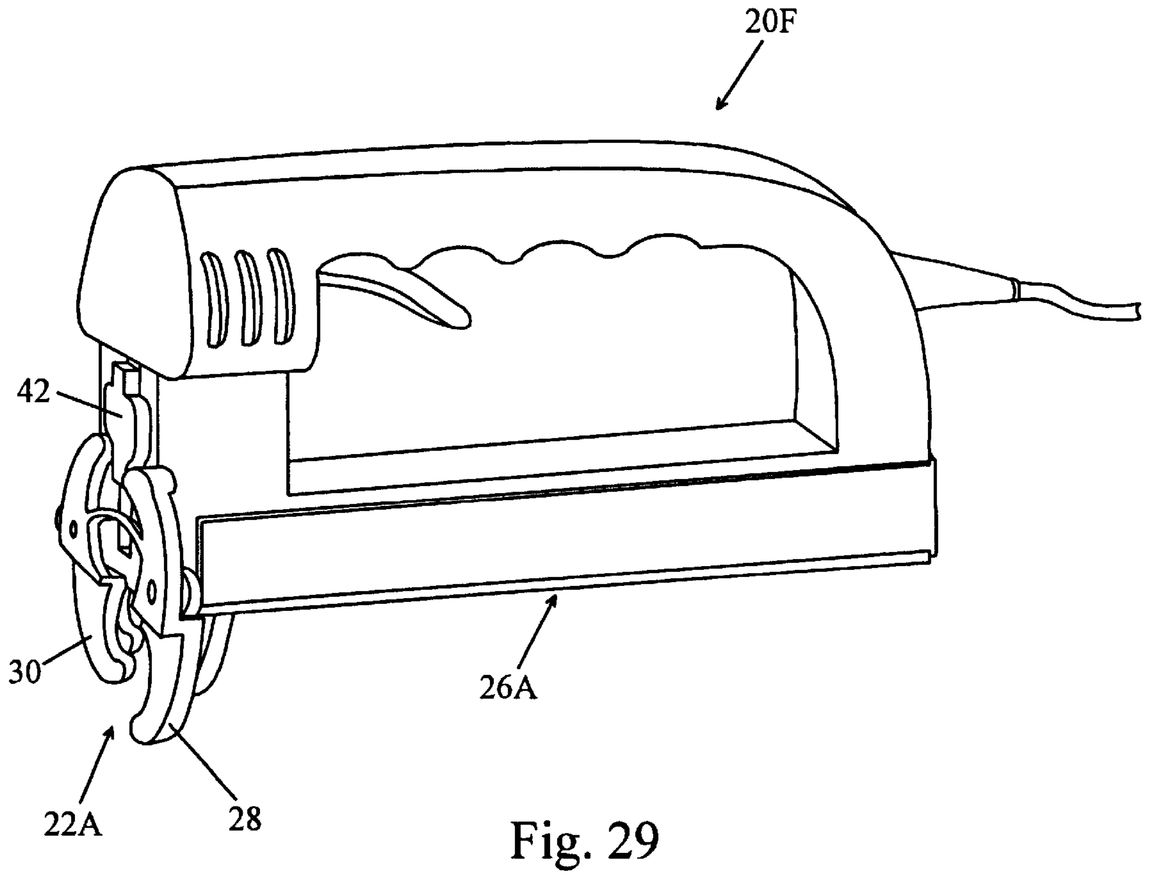
FIG. 29 is a perspective view of a sixth embodiment emitter barb installation tool.

FIG. 29 shows a sixth embodiment emitter barb installation tool 20F. The tool 20F is identical and used in the same general manner as tool 20A except that tool 20F is made so that the emitter barbs 10 are electrically, pneumatically or hydraulically driven into a pipe 5. The present invention is not in any way limited to those driving mechanisms specifically disclosed in this application, and any suitable driving mechanism may be used. For example, a gear driven mechanism (i.e. not shown) may be used in conjunction with the present invention.

Figure 30:
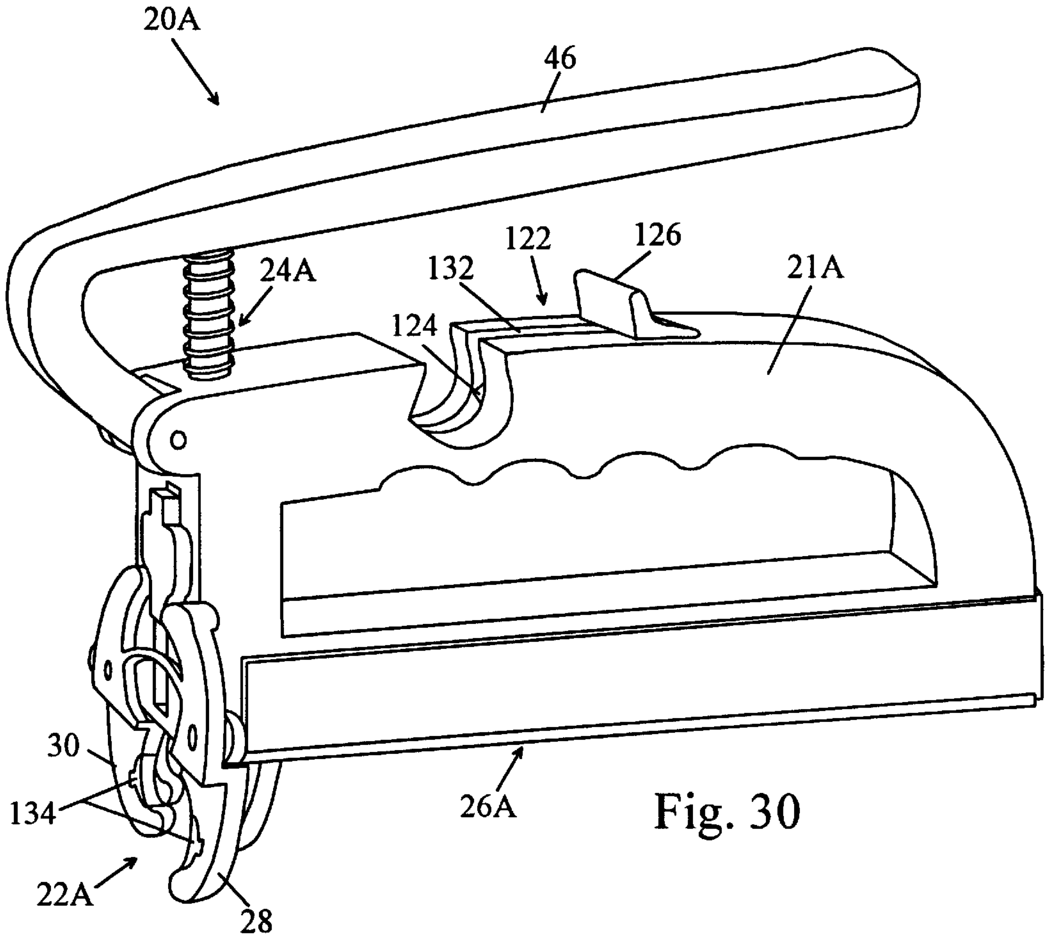
FIG. 30 is a perspective view of the first embodiment emitter barb installation tool with a pipe cutter mechanism and removable jaw inserts.
Figure 31:
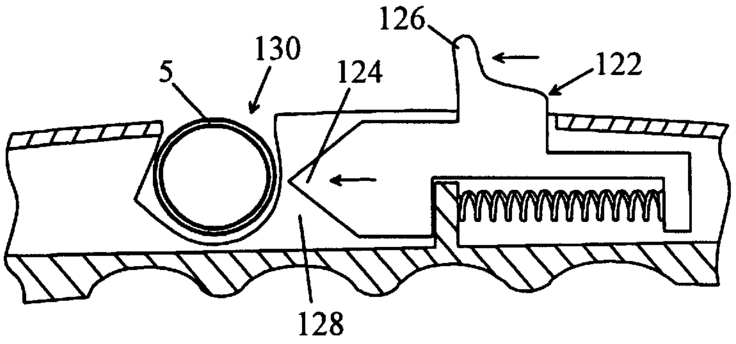
FIG. 31 is a partial cross-sectional side view of the pipe cutter mechanism of FIG. 30.

FIGS. 30 and 31 show a pipe cutter mechanism 122 used with the emitter barb installation tool 20A. The pipe cutter mechanism 122 is located at a top area of the body portion 21A. The pipe cutter mechanism 122 has a cutting blade 124 and a slide tab 126. The cutting blade 124 is slidingly fitted into an area 128 of the body portion 21A. The slide tab 126 is coupled to the cutting blade 124. The pipe 5, emitter barb feeder pipe, or any other type of soft pipe is placed into a receiving area 130, and the slide tab 126 is slid along slot 132 by the user in order to cut the pipe placed therein. Also shown in FIG. 30, the emitter barb installation tool 20A has jaw inserts 134 that are removably and replaceably fitted into the holding jaws 28 and 30. The jaw inserts 134 are removed or disengaged from the holding jaws 28 and 30 to allow a larger diameter pipe 5 to be fitted and held therebetween. The jaw inserts 134 are re-engaged or fitted into the holding jaws 28 and 30 when tool 10A is to be used with a smaller diameter pipe.

Figure 32:
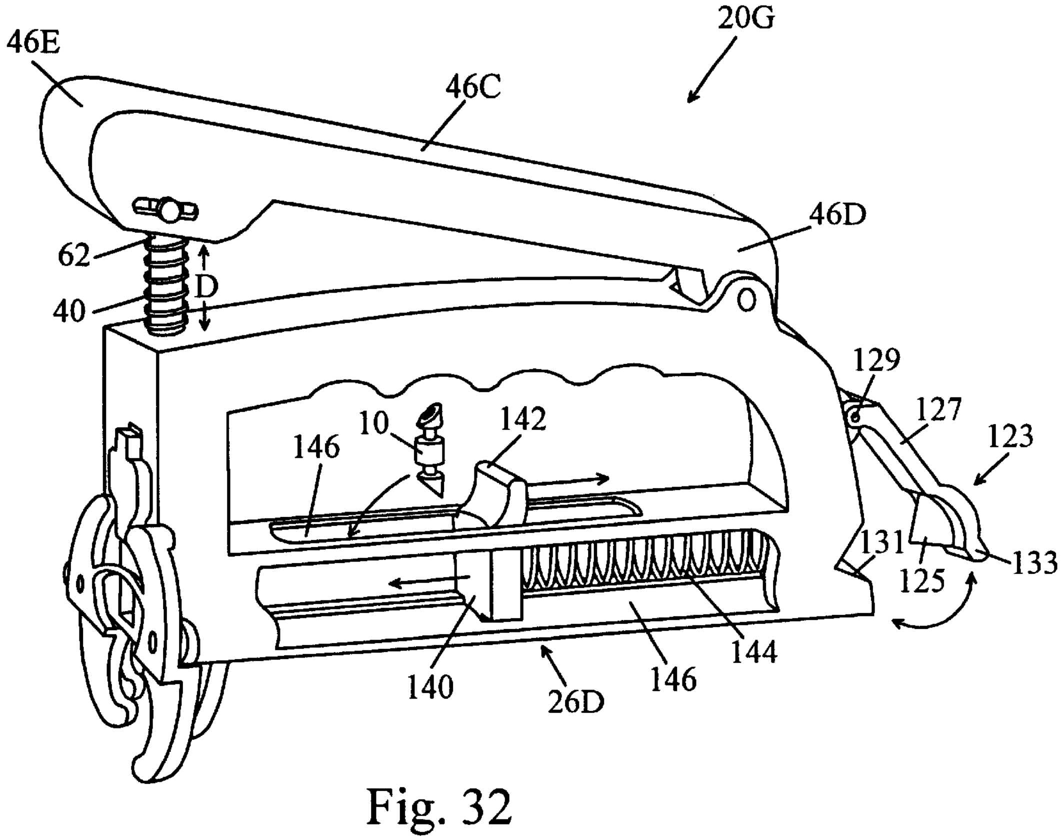
FIG. 32 is a partial perspective view of a seventh embodiment emitter barb installation tool showing a fifth embodiment feeder magazine.

FIG. 32 shows a seventh embodiment emitter barb installation tool 20G. Tool 20G is identical and used in the same general manner as tool 20A except tool 20G has a fourth embodiment driving handle 46C and a fifth embodiment feeder magazine 26D. End 46D of the driving handle 46C is hingedly coupled to the tool 20G at a location that is generally opposite to the location of the drive piston 40. End 46E of the driving handle 46C is coupled to the drive piston 40 at its handle end 62. This handle mounting configuration allows the piston 40 to be driven a greater distance D by the handle 46C.

FIG. 32 also shows a fifth embodiment feeder magazine 26D. The feeder magazine 26D has a driving plate 140 with a slide tab 142 coupled thereto. The driving plate 140 is attached to a feed spring 144. The driving plate 140 and feed spring 144 are placed within the chamber 146. The slide tab 142 extends through an insertion slot 146 and allows the driving plate 140 to be slid by the user to an open position to provide access for barbs 10 or barb clusters 74 to be loaded into the insertion slot 146. As the slide tab 142 is released from the open position, the spring 144 forces the driving plate 140 into contact with the last emitter barb 10 within chamber 146. Tension is placed on the loaded emitter barbs 10 so that the first emitter barb 10 within the chamber 146 is forced to the driving position 54 (i.e. not shown).

FIG. 32 further shows a second embodiment cutter mechanism 123 located at a rear portion of the tool 20G. A pressing member 127 is hingedly coupled to the tool 20G generally at location 129 and a cutting blade 125 is coupled to the pressing member 127 at or near its free end 133. A receiving area 131 is provided within the tool 20G to receive a pipe 5 or any other soft pipe that is to be cut. The cutter mechanism 123 is used by first releasing and moving the free end 133 of the pressing member 127 and blade 125 from the closed and locked position to an open position to allow a pipe to be placed into the receiving area 131. The user then applies pressure to the pressing member 127 to force the cutting blade 125 through the pipe. The pressing member 127 and blade 125 is returned to a closed and locked position.

The preferred embodiment of the invention is described above in the Figures and Detailed Description. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to applicant at the time of filing the application has been presented for the purposes of illustration and description. It is not intended to be exhaustive or to limit the invention to the precise form disclosed, and many modifications and variations are possible in the light of the above teaching. The embodiment was chosen and described in order to best explain the principles of the invention and its practical application and to enable others skilled in the art to best utilize the invention in various embodiments and with various modifications as are suited to the particular use contemplated.

What is claimed is:

1. A tool for feeding and installing barbed fluid fittings into a pipe comprising:

a main body structure, a driving system coupled to the main body structure for driving the barbed fluid fittings from a driving position into the pipe, a feeder system coupled to the driving system for holding and consecutively feeding each of the barbed fluid fittings into the driving position, and a pipe support system for holding and supporting the pipe as the barbed fluid fittings are driven into the pipe wherein the pipe support system comprises at least one jaw moveably coupled to the main body structure and wherein the at least one jaw is able to automatically move between open and closed positions in order to grasp and release the pipe in one continuous motion as the barbed fluid fittings are driven into the pipe.

2. The tool according to claim 1 wherein the feeder system is an independent feeder magazine cartridge that holds the barbed fluid fittings therein and consecutively feeds the barbed fluid fittings into a driving position at least one at a time wherein the independent feeder magazine cartridge releaseably couples to the driving system.

3. The tool according to claim 1 wherein the at least one jaw is two opposing jaws that are able to be pivotably moved between grasping and releasing the pipe.

4. The tool according to claim 1 wherein the feeder system automatically, continuously, and sequentially feeds a next at least one of the barbed fluid fittings into the driving position.

5. The tool according to claim 1 wherein a number of the barbed fluid fittings are detachably coupled to one another to form a barbed fluid fitting cluster that is held in the feeder system and wherein the driving system detaches and drives a next at least one of the barbed fluid fittings from the barbed fluid fitting cluster into the pipe.

6. The tool according to claim 5 wherein the driving system further comprises a detaching component that aids in detaching each of the barbed fluid fittings from the barbed fluid fitting cluster as the each of the barbed fluid fittings is driven into the pipe.

7. The tool according to claim 1 further comprising a cutter component coupled to the main body structure for cutting the pipe.

8. The tool according to claim 1 wherein the driving system further comprises a punch component that is able to punch a starter hole into the pipe as a next at least one of the barbed fluid fittings is driven therein.

9. The tool according to claim 1 wherein the driving system is manually activated and driven.

10. The tool according to claim 1 wherein the driving system is electrically activated and driven.

11. The tool according to claim 1 wherein the driving component is pneumatically activated and driven.

12. The tool according to claim 1 wherein the driving component is hydraulically activated and driven.

13. A method of making a tool for feeding and installing barbed fluid fittings into a pipe comprising the steps of:

providing a main body structure, coupling a driving system to the main body structure for driving the barbed fluid fittings from a driving position into the pipe, coupling a feeder system to the driving system for holding and consecutively feeding each of the barbed fluid fittings into the driving position, and providing a pipe support system for holding and supporting the pipe as the barbed fluid fittings are driven into the pipe wherein the step of providing a pipe support system further comprises the step of:

coupling at least one jaw to the main body structure wherein the at least one jaw is able to automatically move between open and closed positions in order to grasp and release the pipe in one continuous motion as the barbed fluid fittings are driven into the pipe.

14. The method according to claim 13 wherein the step of coupling a feeder system further comprises the steps of:

providing an independent feeder magazine cartridge that holds the barbed fluid fittings therein and consecutively feeds the barbed fluid fittings into a driving position at least one at a time, and releaseably coupling the independent feeder magazine cartridge to the driving system.

15. The method according to claim 13 wherein the at least one jaw is two opposing jaws that are able to be pivotably moved between grasping and releasing the pipe.

16. The method according to claim 13 wherein the feeder system automatically, continuously, and sequentially feeds a next at least one of the barbed fluid fittings into the driving position.

17. The method according to claim 13 wherein a number of the barbed fluid fittings are detachably coupled to one another to form a barbed fluid fitting cluster that is held in the feeder system and wherein the driving system and drives a next at least one of the barbed fluid fittings from the barbed fluid fitting cluster into the pipe.

18. The method according to claim 13 wherein the driving system further comprises a detaching component that aids in detaching each of the barbed fluid fittings from the barbed fluid fitting cluster as the each of the barbed fluid fitting is driven into the pipe.

19. The method according to claim 13 further comprising the step of:

coupling a cutter component to the main boby structure for cutting the pipe.

20. The method according to claim 13 wherein the driving system further the driving system further comprises a punch component that is able to punch a starter hole into the pipe as a next at least one of the barbed fluid fitting is driven therein.

* * * * *